March 11, 1952 — R. CUCHET — 2,588,705
CARRIER HANDLE FOR CAMERAS
Filed Oct. 25, 1949 — 2 SHEETS—SHEET 1

INVENTOR
ROGER CUCHET
BY E. T. Brelum
ATTY.

March 11, 1952   R. CUCHET   2,588,705
CARRIER HANDLE FOR CAMERAS
Filed Oct. 25, 1949   2 SHEETS—SHEET 2

INVENTOR
ROGER CUCHET
By C Freeman
ATTY

Patented Mar. 11, 1952

2,588,705

UNITED STATES PATENT OFFICE 2,588,705

CARRIER HANDLE FOR CAMERAS

Roger Cuchet, Nancy, France

Application October 25, 1949, Serial No. 123,317
In France September 9, 1949

4 Claims. (Cl. 95—86)

1

The present invention relates to an improved handle for cameras, more particularly intended for amateur cameras making use of narrow films. It is known that, in order to shoot with amateur cameras without the latter being mounted on a stand or the like support, it has already been proposed to replace the carrier belt existing in certain types of cameras by a handle-shaped arrangement that allows the operator on one hand to hold and control the camera more easily and with a lesser strain while on the other hand he cuts out completely the shifting of the camera that generally occurs at the beginning and at the end of each scene to be photographed.

It is known moreover that for certain shots performed under particular conditions of light intensity, it is necessary to position in front of the operative object glass a screen or filter and a sunshade, to be designated hereinafter indifferently as a screen for sake of simplicity.

The chief object of the invention is to provide a carrier for a camera of the type referred to hereinabove, said carrier arrangement being designed so as to serve as well as a carrier for a screen holder or a filter and a sunshade, that is more particularly suitable for turret type cameras wherein the different object glasses are carried near one another.

A preferred embodiment of the invention is illustrated merely by way of example in the accompanying drawings in which.

In the embodiment illustrated, the carrier handle includes a body 1 to the upper surface of which a camera may be removably secured by means of a screw 2 the operative head 3 of which may be reached through two suitable openings provided in said body.

Figure 1:
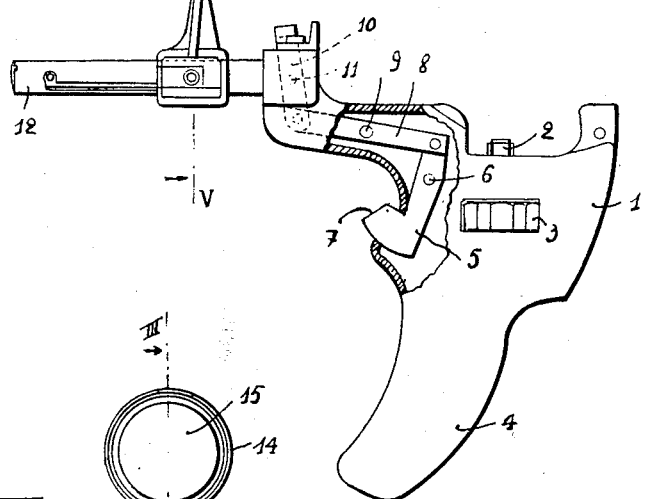
Fig. 1 is an elevational view partly torn off of the carrier handle.

At its lower end, the body 1 ends with a part 4 assuming the shape of a revolver grip and directed, as apparent from Fig. 1, forwardly with reference to the body 1, said part 4 being incurved so as to match as accurately as possible the shape of the hand of the operator holding it. By reason of the particular shape given to said grip 4, the operator may hold the camera in a

2 perfectly horizontal position; the hand with which the operator takes hold of the grip retains thus its natural position without any muscular contraction throughout the view-taking or shooting operation, which forms an important advantage with reference to any similar arrangement existing nowadays.

The trigger system for controlling from a distance the shutter release of the camera that is not illustrated is constituted by a lever 5 pivotally secured to a stationary spindle 6, the lower end of said lever projecting with reference to the body 1 immediately above the grip 4 and forming a trigger end 7 on which the operator may act with one finger of the hand with which he holds the grip firmly.

The upper end of the lever 5 is pivotally secured to a second lever rotatably carried by a stationary stud 9 and pivotally secured in its turn to a rod 10 rotatably carried by a spindle 11. The free end of the rod 10 projects beyond the body 1 and lies in front of the shutter release knob of the camera so that the operator may by a mere pressure exerted on the trigger end 7 start the camera working through the agency of the rod 10.

As illustrated, the different levers of the shutter releasing mechanism are housed inside the body of the carrier handle.

Figure 2:
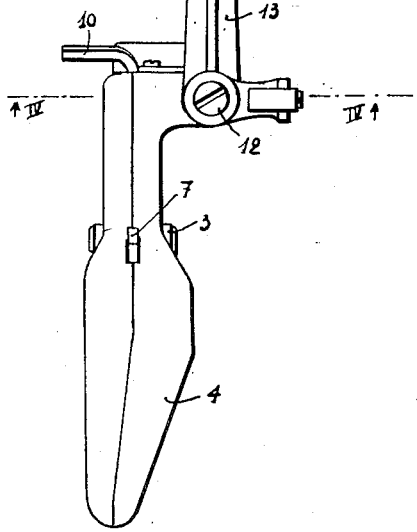
Fig. 2 is a side view corresponding to Fig. 1.
Figure 3:
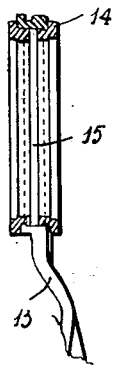
Fig. 3 is a detail sectional view on a larger scale, the section being made through line III—III of Fig. 2.

On its front surface, the body 1 of the carrier handle is provided with a rod 12 carrying a member 13 ending at its upper end with a circular fitting inside which is secured a screen or filter or a sunshade 15 as illustrated in Figs. 1 to 3.

Figure 4:
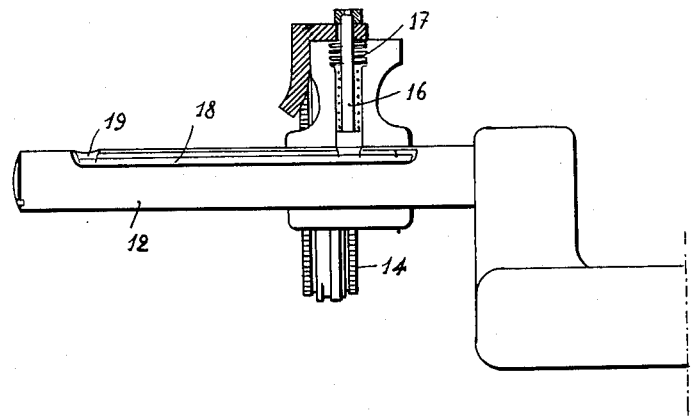
Fig. 4 is a detail sectional view on a larger scale through line IV—IV of Fig. 2.
Figure 5:
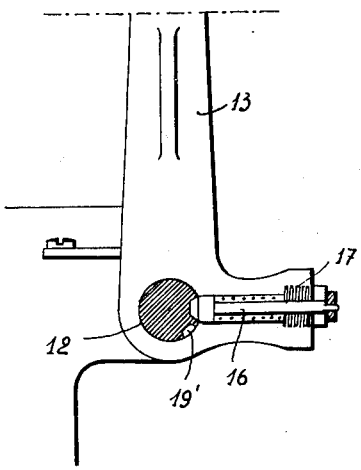
Fig. 5 is a detail sectional view on a larger scale through line V—V of Fig. 1.

Figs. 4 and 5 show more particularly how the member 13 is slidingly secured through its lower end on the rod 12, said member being provided with a sliding projection 16 submitted to the action of the spring 17 urging its tip into engagement with a longitudinal groove 18 formed in said rod 12. The bottom of said groove 18 is furthermore provided with recesses 19 at points corresponding to the different focal lengths of the turret of the camera and inside each of which the tip of the projections 16 may engage. Said projection 16 is controlled by a pusher member acting, when the operator acts on same in antagonism with the action of the spring 17, so as to release the tip of the projection 16 with reference to the recess 19 engaged by said projection tip.

Due to the arrangement disclosed, it is possible when the tip of the projection 16 engages none of the recesses 19, to shift the member 13 over the rod 12 so as to adjust the position of the screen 15 with reference to the object glass of the camera that is to be used for view taking or shooting, after which said member 13 is clamped in the desired position by allowing the tip of the projection 16 to engage the recess 19 corresponding to the selected position.

To each of the recesses 19 referred to corresponds on the rod 12 a second exactly similar recess 19' that may be engaged by the tip of the projection 16 after it has released the recess 19 associated therewith and after the member 13 has rocked to a small extent round the rod 12. The angle formed by the axes of the two corresponding recesses 19 and 19' that are always located in a same transversal plane is such that when the tip of the projection 16 has engaged the recess 19' the screen collapses and is no longer in front of the object glass with which it has precedingly registered, although the distance of said screen with reference to the object glass has not been modified.

The arrangement disclosed in the last paragraph allows using the improved carrier handle, even in the case of cameras having a very small object glass turret, without removing any of the three object glasses from said turret. Furthermore, the screen or the like support allows an easy passage from one object glass to the other during the shooting with an immediate adjustment of the arrangement as required by the change of object glass. Obviously, the carrier handle has been described hereinabove and illustrated by way of exemplification and by no means in a limiting sense and various detail modifications may be brought to the embodiment described without thereby unduly widening the scope of the invention as defined in accompanying claims. Thus, e. g. the handle need not carry a member serving as a screen or filter carrier or as a sunshade, which latter may merely form an auxiliary adapted to be fitted on handles of a type different from that disclosed or else directly on the turret camera.

What I claim is:

1. A camera holder comprising a handle, means to attach the camera to said handle, said handle being provided with a hollow extension forwardly projecting from the upper portion of said handle, a system of pivotally connected levers in said extension, a trigger projecting from said handle into the reach of the operator's hand operatively connected with the lower end lever of said lever system, a rod connected with the upper end lever of said lever system extending with its free end laterally beyond said handle and adapted to operate a shutter release means, a circular bar rigidly attached to said hollow extension and forwardly projecting from the same, a longitudinal groove in said bar, a screen and a screen supporting member slidably and rockably supported on said bar, a projection stud carried by said screen supporting member radially extending relative to said bar and a spring surrounding said projection stud to urge the same into engagement with said groove.

2. A camera holder comprising a handle, means to attach the camera to said handle, said handle being provided with a hollow extension forwardly projecting from the upper portion of said handle, a system of pivotally connected levers in said extension, a trigger projecting from said handle into the reach of the operator's hand operatively connected with the lower end lever of said lever system, a rod connected with the upper end lever of said lever system extending with its free end laterally beyond said handle and adapted to operate a shutter release means, a circular bar rigidly attached to said hollow extension and forwardly projecting from the same, a longitudinal groove in said bar, a plurality of recesses in the bottom portion of said groove, a screen and a screen supporting member slidably and rotatably supported on said bar, a projection stud carried by said screen supporting member radially extending relative to said bar and a spring surrounding said projection stud to urge the same into engagement with said recesses.

3. A camera holder comprising a handle, means to attach the camera to said handle, said handle being provided with a hollow extension forwardly projecting from the upper portion of said handle, a system of pivotally connected levers in said extension, a trigger projecting from said handle into the reach of the operator's hand operatively connected with the lower end lever of said lever system, a rod connected with the upper end lever of said lever system extending with its free end laterally beyond said handle and adapted to operate a shutter release means, a circular bar rigidly attached to said hollow extension and forwardly projecting from the same, a longitudinal groove in said bar, a plurality of couples of adjacent recesses located in a common transversal plan relative to and in the bottom portion of said groove, a screen and a screen supporting member slidably and rotatably supported on said bar, a projection stud carried by said screen supporting member radially extending relative to said bar and a spring surrounding said projection to urge the same into selective engagement with either one of a couple of recesses.

4. A camera holder comprising a handle, means to attach the camera to said handle, said handle being provided with a hollow extension forwardly projecting from the upper portion of said handle, a system of pivotally connected levers in said extension, a trigger projecting from said handle into the reach of the operator's hand operatively connected with the lower end lever of said lever system, a rod connected with the upper end lever of said lever system extending with its free end laterally beyond said handle and adapted to operate a shutter release means, a circular bar rigidly attached to said hollow extension and forwardly extending from the same, a longitudinal groove in said bar, a screen and a screen supporting member slidably and rotatably supported on said bar, a projection stud carried by said screen supporting member radially extending relative to said bar, a spring surrounding said projection stud into engagement with said groove and means to disengage said projection stud from said groove against the action of said spring.

ROGER CUCHET.

REFERENCES CITED

The following references are of record in the file of this patent:

UNITED STATES PATENTS

| Number | Name | Date |
|---|---|---|
| 1,621,903 | Rossiter | Mar. 22, 1927 |
| 1,754,282 | Owens | Apr. 15, 1930 |
| 2,235,355 | Brown | Mar. 18, 1941 |
| 2,275,644 | Olmstead | Mar. 10, 1942 |
| 2,483,711 | Roos | Oct. 4, 1949 |